United States Patent [19]

Race

[11] Patent Number: 5,057,230

[45] Date of Patent: Oct. 15, 1991

[54] DISSOLUTION OF GAS

[75] Inventor: Michael J. Race, South Yorkshire, England

[73] Assignee: The BOC Group plc, Surrey, England

[21] Appl. No.: 496,392

[22] Filed: Mar. 20, 1990

[51] Int. Cl.$^5$ .............................................. C02F 1/72
[52] U.S. Cl. .................................. 210/758; 210/221.2; 261/36.1; 261/DIG. 75
[58] Field of Search ...................... 210/758, 220, 221.2; 261/36.1, DIG. 25

[56] References Cited

U.S. PATENT DOCUMENTS

| | | | |
|---|---|---|---|
| 2,126,164 | 8/1938 | Anderson | 210/220 |
| 2,241,337 | 5/1941 | Work | 261/DIG. 75 |
| 2,616,676 | 11/1952 | Walker | 210/220 |
| 3,954,921 | 5/1976 | Yoshida et al. | 261/116 |
| 4,005,015 | 1/1977 | Boward, Jr. | 210/220 |
| 4,085,171 | 4/1978 | Baker et al. | 261/119 |
| 4,093,549 | 6/1978 | Wilson | 210/220 |
| 4,112,025 | 9/1978 | Wilson et al. | 261/76 |
| 4,155,959 | 5/1979 | Blum | 210/220 |
| 4,157,304 | 6/1979 | Molvar | 210/220 |
| 4,163,712 | 8/1979 | Smith | 261/DIG. 75 |
| 4,206,052 | 6/1980 | Mandt | 210/220 |
| 4,210,534 | 7/1980 | Molvar | 210/220 |
| 4,224,158 | 9/1980 | Molvar | 210/220 |
| 4,226,719 | 10/1980 | Woltman | 210/220 |
| 4,229,302 | 10/1980 | Molvar | 210/220 |
| 4,242,289 | 12/1980 | Blum | 210/220 |
| 4,271,099 | 6/1981 | Kulka | 261/76 |
| 4,290,979 | 9/1981 | Sugiura | 261/4 |
| 4,489,016 | 12/1984 | Kriebel | 210/221.2 |
| 4,563,277 | 1/1986 | Tharp | 210/220 |
| 4,857,185 | 8/1989 | Desjardins | 210/220 |

FOREIGN PATENT DOCUMENTS 1455567 11/1976 United Kingdom .

Primary Examiner—Stanley S. Silverman
Assistant Examiner—Cynthia L. Nessler
Attorney, Agent, or Firm—Robert I. Pearlman; David M. Rosenblum

[57] ABSTRACT

A pump forms a pressurized stream of waste water, supplying it to a ring main which feeds the liquid to a plurality of conduits depending therefrom. Each conduit has a venturi whose throat has an inlet for gaseous oxygen formed therein. The throat of each venturi has a plurality of apertures through which gas is introduced from a chamber surrounding the throat. Each conduit ends in one or more nozzles immersed in a volume of liqud. Each venturi restricts the flow of water therethrough and creates turbulence so that a turbulent flow of liquid containing oxygen bubbles is emitted from the associated nozzle at relatively high velocity such that turbulence assisting the dissolution of oxyen is created in the volume of liquid.

12 Claims, 3 Drawing Sheets

DISSOLUTION OF GAS

This invention relates to a method and apparatus for dissolving a gas, for example oxygen, in a liquid, for example water or other aqueous medium. The invention is limited neither to the example of oxygen as the gas nor to the example of an aqueous medium as the liquid but may be used to dissolve other gases having a greater or lesser solubility than oxygen in aqueous or non-aqueous media.

Our UK patent specification No 1 455 567 discloses a process for treating liquid including the steps of taking a stream of the liquid, pressurising the stream, introducing a treatment gas into the pressurised stream so as to dissolve therein some of the gas, and introducing the stream containing dissolved and undissolved gas into a volume of the liquid under turbulent conditions such that the undissolved gas enters the volume of liquid in the form of fine bubbles that either dissolve or are consumed within the volume of liquid. The method is typically used to dissolve oxygen in an aqueous medium. The oxygenated stream is typically introduced back into the main volume of liquid through one or more orifices or jets. Undissolved oxygen bubbles are transported in the stream to the orifices or jets. The length of the conduit through which the stream flows from the point of oxygenation to the jet or jets is chosen so as to facilitate dissolution of some of the gas in the liquid without being so long that the gas bubbles tend to coalesce into separate pockets or slugs of gas or that the pressure drop is disproportionate to the amount of gas that dissolves in the conduit.

The process described in UK patent specification 1 455 567 has been commercially successful particularly in the oxygenation of water to improve the treatment of sewage. He attribute this success at least in part to the fact that the process admits much more gas to be retained in the body of the liquid than prior process operating with same power consumption. By using the stream as a carrier of gas bubbles a much higher quantity of gas can be successfully dissolved than if the amount of gas carried in the stream is merely limited to that which can be dissolved therein.

Another advantage afforded by the process according to UK patent specification 1 455 567 is that the stream returning to the main volume of liquid agitates the liquid thereby helping to keep solids in suspension and assisting in the distribution of oxygen throughout the volume. However, a difficulty arises when a large volume of liquid, for example an activated sludge tank used in the treatment of sewage having a volume of more than 1000 $m^3$ (cubic metres), a sewage lagoon, or a long stretch of river requires oxygenation. The difficulty is that more than one oxygenation apparatus with its own separate pump is required. The requirement arises out of the fact that if several subsidiary oxygenated streams are returned to the main volume of liquid at widely spaced locations, there is a high frictional loss in the associated pipework with a result that the subsidiary streams do not impart sufficient energy to the main volume of the liquid to cause the desired degree of agitation.

According to the present invention there is provided a method of dissolving gas in a liquid, wherein a main stream of pressurised liquid is divided into a plurality of subsidiary streams, turbulence is created in each subsidiary stream, gas is introduced into each region of turbulence whereby the gas is formed into bubbles, and the resulting subsidiary streams of liquid-gas mixture are introduced into a volume of liquid to be treated by the gas under such turbulent conditions that dissolution of the gas bubbles in the volume of liquid is facilitated.

The invention also provides apparatus for dissolving gas in a volume of liquid comprising a pump having an inlet in communication with the volume and an outlet in communication with a main, a plurality of subsidiary conduits communicating with the main liquid, each subsidiary conduit having a restriction therein for creating turbulent liquid flow, an inlet for gas to be dissolved communicating with a region of said conduit where in use there is turbulent liquid flow, and at least one outlet for the resulting mixture of liquid and gas terminating in the volume of liquid, the outlets being adapted and arranged such that in the turbulent conditions are able to be created in the volume of liquid.

The method and apparatus according to the invention are particularly suited for use in oxygenating waste water. By introducing oxygen into the subsidiary conduits only, it is possible to keep the liquid flow velocity in the main relatively low, say just above the value necessary to scour the main of any deposited solids, and thereby keep down frictional losses of the pumping energy such that a relatively high proportion of this energy can be used in agitating the liquid.

It is accordingly preferred that the length of each subsidiary conduit is as short as possible: preferably under five metres and more preferably under two metres. Indeed, each subsidiary conduit may simply take the form of a nozzle preferably having an upstream venturi portion in which, in use, the gas to be dissolved may flow. Each conduit preferably has a diameter or average diameter substantially less than that of the main, whereby the liquid is accelerated as it flows into the subsidiary conduit. The subsidiary conduits are preferably substantially identical to one another and are preferably equally distributed about the main. In some embodiment of the invention each subsidiary conduit preferably drops generally vertically from the main to the outlet. However, when each subsidiary conduit consists of a nozzle, each such nozzle may typically be disposed at any angle that is suitable for the treatment to be performed. Although it is possible to provide each subsidiary conduit with more than one outlet it is preferred that each conduit has just one such outlet.

The method and apparatus according to the invention will now be described by way of example with reference to the accompanying drawings in which.

Figure 1:
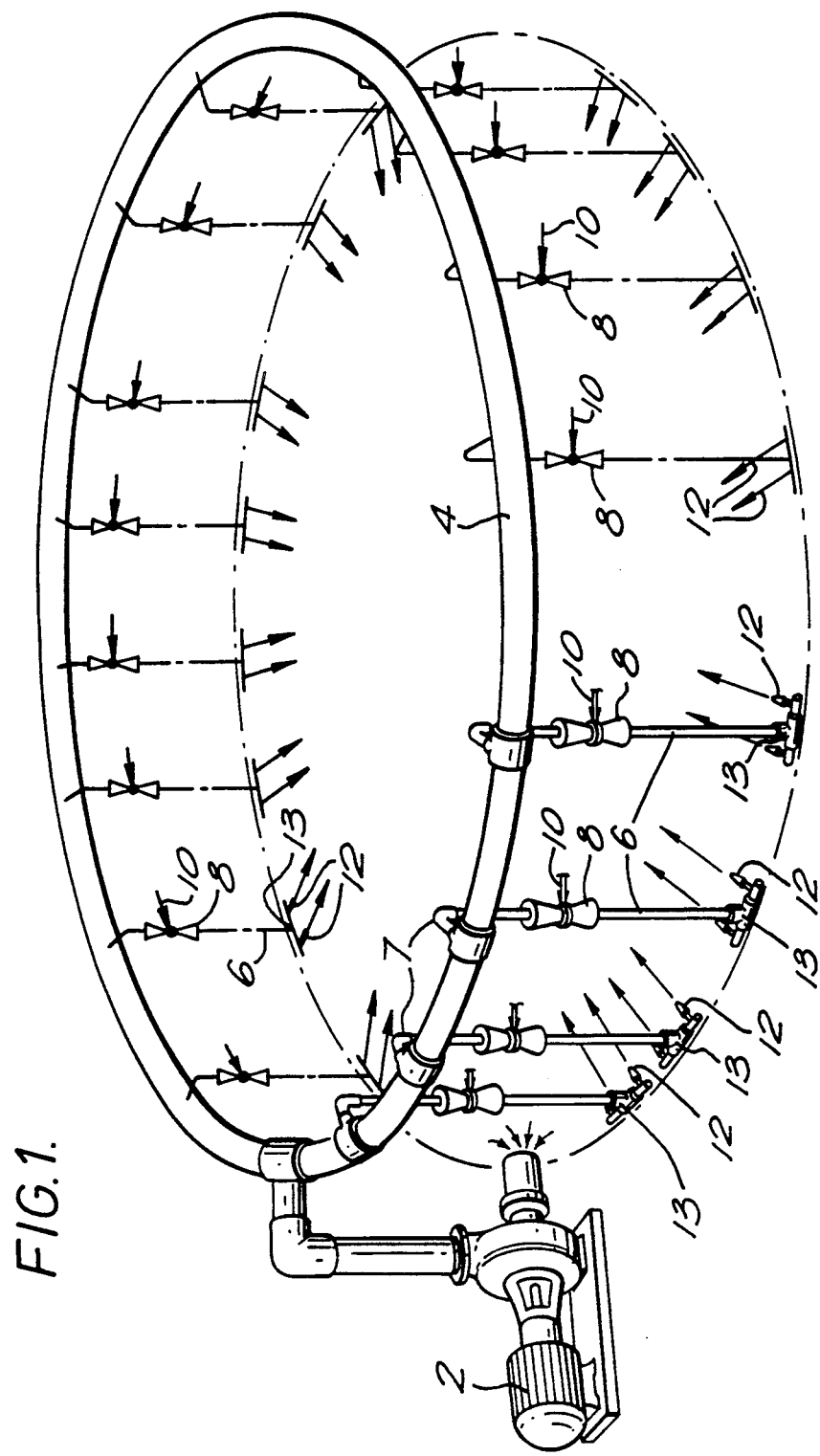
FIG. 1 is a schematic drawing, partly in perspective, of a first oxygenation apparatus according to the invention.

The drawings are not to scale.

In the ensuing description of the drawings, like parts in different drawings are referred to by the same reference numeral.

Referring to FIG. 1 of the drawings, the illustrated apparatus may be located wholly within a large volume of liquid for example that contained in a sewage treatment tank for use in the activated sludge process. A sewage pump 2 having a suction inlet forms a stream of waste water at a pressure of typically 2 to 4 atmospheres absolute. The stream enters a ring main 4. The velocity of flow of liquid in the ring main 4 is sufficient to prevent the build-up of solids in the ring main 4. The ring main 4 is adapted to feed the liquid to a plurality or multiplicity of equally-spaced subsidiary conduits 6 which depend generally vertically therefrom though each such conduit is formed with an upstream elbow 7 contiguous with the main 4. Each conduit 6 is typically less than five metres in length and has a venturi 8 disposed therein at an upper region thereof. Each venturi 8 has an inlet 10 for gaseous oxygen. The oxygen inlets 10 are connected to a common oxygen main (not shown in FIG. 1) which is typically supplied from a plant for separating air by pressure swing adsorption (or by using membranes}or is a storage vessel containing liquid oxygen and fitted with an evaporator whereby the oxygen may be supplied to the conduit 6 in gaseous state. Each venturi 8 creates a restriction in its associated conduit 6 whereby turbulence is imparted to the liquid flowing therethrough. It is also to be appreciated that the conduit 6 is preferably formed of a diameter substantially less than that of the ring main 4 whereby the liquid is accelerated as it flows from the ring main 4 into the conduit 6. The flow of oxygen to the turbulent region from the inlet 10 breaks the oxygen into bubbles. The suction created by the flow of liquid through the venturi may be used to create or assist the flow of oxygen.

Each conduit 6 has a downstream T-piece pipe 13 at its bottom end in which is received one or more outlet nozzles for passing liquid-gas mixture into the main volume of liquid in which the ring main is immersed. Each nozzle 12 has an outlet diameter much smaller than that of the diameter of the associated conduit 6 whereby the liquid-gas mixture leaves the nozzle 12 at a relatively high velocity thereby creating turbulence, helping further to break up or shear bubbles in the mixture into even smaller bubbles that are readily consumed by or dissolve in the main body of liquid and providing agitation for the main body of liquid. Typically, the nozzles 12 are disposed in such a way that an adequate degree of agitation can be maintained within the main vessel without the need to resort to additional mechanical agitators.

In one example of the method according to the invention a tank having a diameter of 30 metres is fitted with a ring main which has a circumference of about 88 metres. There are 16 equally-spaced subsidiary conduits 6 depending from the ring main 4. The ring main has an internal diameter of 20 centimetres (8 inches) and is typically formed of PVC tubing. Each conduit 6 has above its venturi 10 a diameter of 7.5 cm (3 inches) and below the venturi 8 a diameter of 5 cm (2 inches). The outlet of each nozzle 12 typically has a diameter typically in the range of 10 to 45 millimetres and in this example 25 mm. The pump 2 is operated so as to maintain a liquid velocity of 0.6 m s$^{-1}$ (2 feet per second) within the ring main 4. Such a velocity is usually sufficient to scour any deposited solids from the ring main, though if desired greater velocities eg up to 1.2 m s$^{-1}$ (4 feet per second) may be used. The apparatus shown in FIG. 1 may for example be used to dissolve 5 tonnes per day of oxygen in, and mix, a volume of 3000 m$^3$ of waste water employing a pump 2 capable of delivering 1110 m$^3$ per hour of water to the ring main 4 at a pressure of approximately 2.5 atmospheres absolute.

Figure 2:
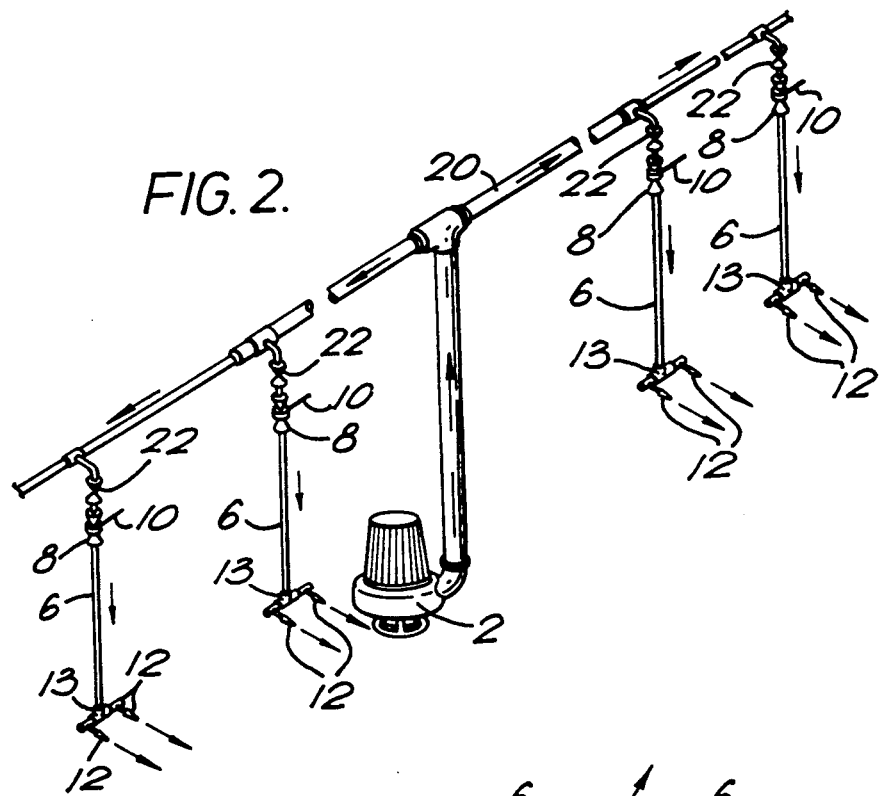
FIG. 2 is a schematic drawing, partly in perspective, of a second oxygenation apparatus according to the invention.

Referring to FIG. 2 of the drawings, there is shown an apparatus essentially similar to that of FIG. 1 save that an elongate main 20 is used instead of the ring main 4. In order to equalise the flows to the subsidiary conduits 6, which flows tend to be more variable than when a ring main used, each conduit 6 is provided with a manually-operable flow control valve 22. The valves 22 can be set to compensate for the effect of pressure drop as the pumped liquid flows ever further away from the pump 2. If desired, the T-piece 13 may be constructed with a swivel or other joint whereby the direction in which each pair of nozzles 12 point can be set independently of the others. In other respects, the operation and construction of the apparatus shown in FIG. 2 is analogous to that shown in FIG. 1. The apparatus shown in FIG. 2 can for example be used to oxygenate rivers, lagoons, harbours, multiple fish ponds, large activated sludge tanks, and estuaries.

Figure 3:
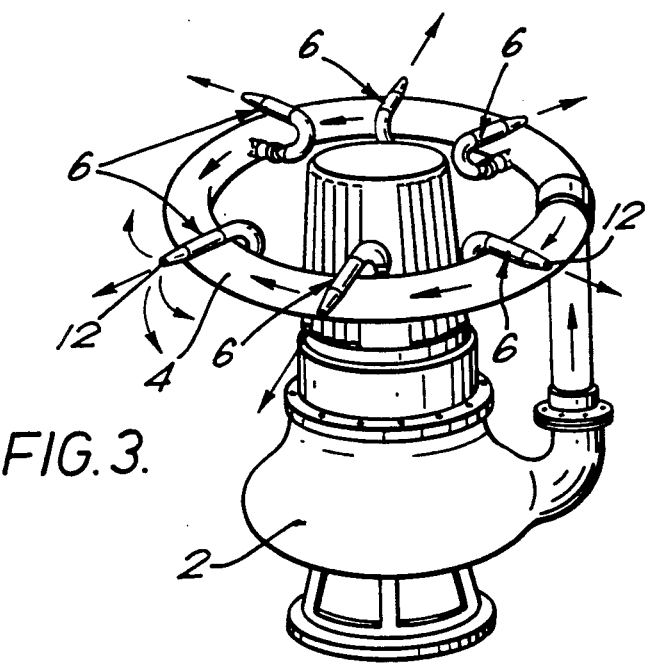
FIG. 3 is a schematic perspective view of a third oxygenation apparatus according to the invention.

In FIG. 3, there is shown another alternative apparatus to that shown in FIG. 1. The main difference between the two apparatuses is that the conduits 6 are shorter in the length in the apparatus shown in FIG. 3 than in that shown in FIG. 1. The conduits 6 are each generally J-shaped and in a single nozzle 12 and are received in an inwardly facing part of the surface of the ring main 4. The nozzles 12 each face outwardly of the ring main. Although not shown in FIG. 3, each conduit 6 has a venturi connected to an oxygen main at its throat. The conduits 6 may be constructed with a joint or bearing whereby the direction in which each nozzle 12 points may be adjusted independently, either up or down or to the left or right. Such an arrangement facilitates oxygenation and mixing of the entire volume of liquid in which the apparatus shown in FIG. 3 is immersed. In a typical example of the operation of an apparatus as shown in FIG. 3, the pump 2 delivers 280 m$^3$/hour of water to the ring main at a pressure of approximately 2.5 atmospheres absolute and dissolves 1 tonne/day of oxygen in a volume of 500 m$^3$ of water. Typically, in operation, a liquid stream in which are dispersed fine gas bubbles leaves each nozzle 12 at a velocity of about 12 m s$^{-1}$.

Figure 4:
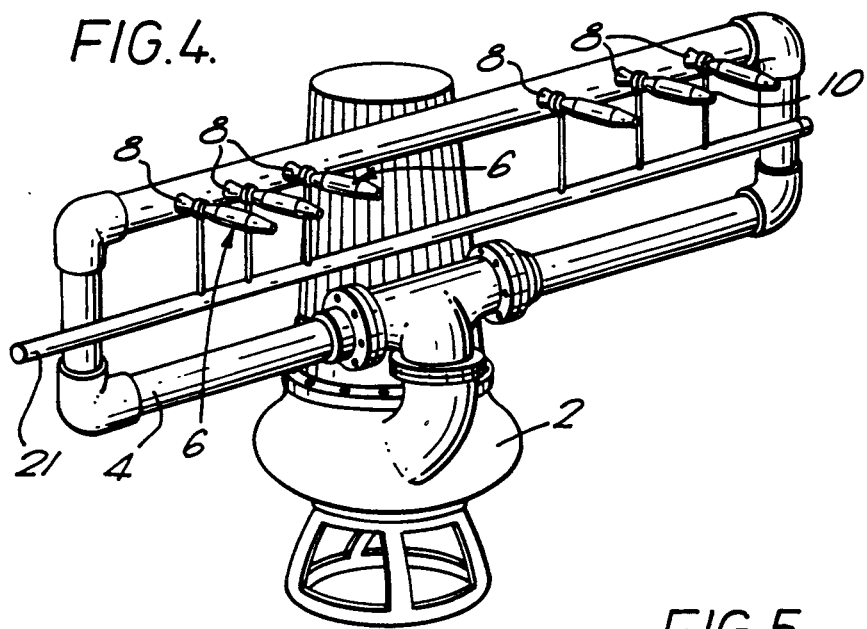
FIG. 4 is a schematic perspective view of a fourth oxygenation apparatus according to the invention.
Figure 5:
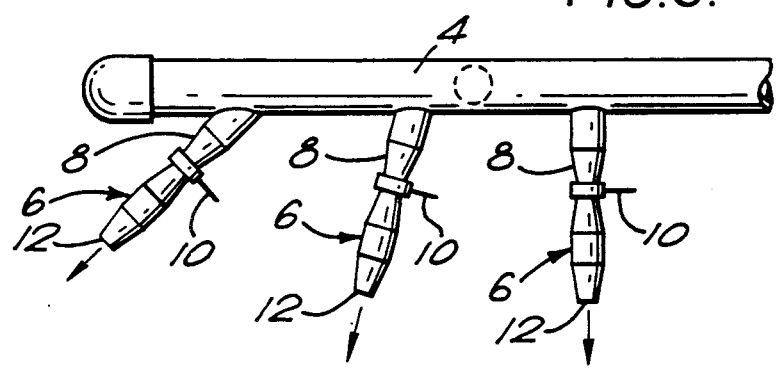
FIG. 5 is a plan view of part of a fifth oxygenation apparatus according to the invention.

Referring to FIG. 4 of the drawings there is shown an apparatus generally similar to those illustrated in FIGS. 1 and 3. In the apparatus shown in FIG. 4, the main 4 is endless and defines the shape of a rectangle. The main 4 is disposed generally vertically. Each conduit 6 is disposed generally horizontally and is formed as a one-piece construction with its associated venturi 8 and nozzle 12, these three parts all being coaxial with one another. Oxygen is supplied to the inlets 10 from a main 21. As shown in FIG. 5, the nozzles 12 may be arranged in a fanned arrangement with respect to one another.

Figure 6:
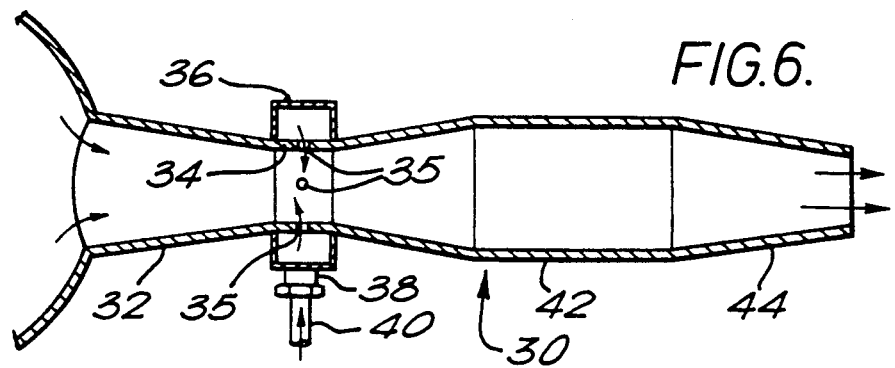
FIG. 6 is a sectional elevation of a nozzle for use in the oxygenation apparatuses shown in FIGS. 4 and 5.

The nozzle devices shown in FIGS. 4 and 5 are shown in more detail in FIG. 6 of the drawings. The tubular device 30 shown in FIG. 6 has an upstream venturi 32 whose inlet is joined to the main 4. The throat 34 of the venturi 32 is formed with apertures 35 which communicate with an annular gas distribution chamber 36 surrounding the throat 34. The chamber 36 has an inlet 38 communicating with a gas distribution pipe 40. The downstream end of the venturi 32 is contiguous with a right cylindrical portion 42 of the tubular device 30, which portion 42 is contiguous with a nozzle 44 which tapers in the downstream direction. In operation, a stream of water or liquid under pressure flows from the main 4 into the upstream end of the venturi 32. The throat 34 creates turbulence in the stream. Oxygen or other gas to be dissolved is introduced into the stream by passage from the chamber 36 through the apertures 35. The suction created by the flow of liquid through the venturi 32 may be sufficient to induce a flow of oxygen into the stream, or the oxygen may be supplied under a superatmospheric pressure sufficient to ensure its entry into the stream. The throat 34 of the venturi 32 acts a restriction which creates turbulence in the stream, thus facilitating the break-up of the gas into bubbles. In the portion 42 of the device 30 the flow of the stream is rendered less turbulent. This portion 42 may have a length in the range of 0.3 to 1 m, and thus being relatively short keeps to a minimum pressure drop. The stream of liquid then enters the body of liquid, in which the apparatus according to the invention is immersed, through the nozzle 44 as a Jet with a velocity typically in the range of 10 to 20 m s$^{-1}$. Such a velocity helps to create turbulence at the exit of the nozzle 44 which tends to shear the oxygen bubbles into bubbles of smaller size, while enabling the oxygen bubbles to penetrate into regions of the volume of liquid to be treated remote from the nozzle. The energy in the jet is thus dissipated in a relatively large volume of liquid which helps to keep the liquid well mixed.

Referring again to FIGS. 3 and 4, the pumps 2 shown therein are of a kind which can stand at the bottom of a tank or on a specially provided platform (not shown) such that the whole apparatus can be lowered into a tank of water to be oxygenated, so that the only connections to be made to services outside the tank are to the oxygen source and to the power line for the pump 4. Thus, installation of an apparatus of the kind shown in FIG. 3 or 4 is particularly simple to carry out.

I claim:

1. A method of dissolving a gas in a volume of a liquid comprising:
    pressurizing the liquid;
    forming a main stream of the liquid;
    distributing the main stream into a plurality of subsidiary streams having a length of less than about 2.0 meters and a velocity greater than that of the main stream;
    passing each of the subsidiary streams through a venturi including a throat having a plurality of apertures, the throat configured to create turbulence therein;
    introducing the gas into the turbulence through the apertures in the throat from a chamber surrounding the throat to create fine bubbles of the gas; and
    after the introduction of the gas into the turbulent flow regions, introducing each of the subsidiary streams into the volume of the liquid at a velocity sufficient to create further turbulence causing the fine bubbles to shear into smaller bubbles that readily dissolve in the volume of the liquid.

2. The method of claim 1, in which the velocity of the flow of the main stream is in a range of between about 0.6 m/sec. and about 1.2 m/sec.

3. The method of claim 1, in which the liquid is selected from a group consisting of water, sewage, and aqueous waste material.

4. The method of claim 3, in which the gas is oxygen.

5. The method of claim 1, in which each subsidiary stream is introduced into the volume of the liquid in the form of one or more jets, each of the jets having a velocity in a range of between about 10.0 m/sec. and about 20.0 m/sec.

6. The method of claim 5, in which the velocity of the flow of the main stream is in a range of between about 0.6 m/sec. and about 1.2 m/sec.

7. An apparatus for dissolving a gas in a volume of a liquid, comprising:
    a pump having a pump inlet in communication with the volume of the liquid and a pump outlet;
    a main conduit having an inlet in communication with the pump outlet; and
    a plurality of subsidiary conduits in communication with the main conduit, the subsidiary conduits dimensioned such that the liquid accelerates in flowing from the main conduit to each of the subsidiary conduits and the subsidiary conduits have a length of less than about 2.0 meters;
    each of the subsidiary conduits including:
        a venturi having, a throat configured to create turbulence in the flowing liquid, a plurality of apertures defined in the throat of the venturi, and a gas chamber surrounding the throat and in communication with the apertures to introduce the gas into the turbulence and thereby to form fine bubbles of the gas; and
        a nozzle terminating in the volume of the liquid and having an outlet configured such that the liquid is introduced into the volume of liquid at a velocity sufficient to create further turbulence causing the fine bubbles to shear into smaller bubbles that readily dissolve in the volume of the liquid.

8. The apparatus of claim 7, in which the venturi is contiguous with the main conduit.

9. The apparatus of claim 7, in which the pump, the main and subsidiary conduits define a free-standing unit.

10. The apparatus of claim 7, in which the venturi is integral with the nozzle.

11. The apparatus of claim 10, in which the positions of the nozzles are independently adjustable with respect to one another.

12. The apparatus of claim 11, in which the venturi is contiguous with the main conduit.

* * * * *